(12) United States Patent
Kato

(10) Patent No.: US 10,530,192 B2
(45) Date of Patent: Jan. 7, 2020

(54) NON-CONTACT POWER TRANSMISSION APPARATUS AND NON-CONTACT POWER SUPPLY DEVICE

(71) Applicant: TOSHIBA TEC KABUSHIKI KAISHA, Shinagawa-ku, Tokyo (JP)

(72) Inventor: Masakazu Kato, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 130 days.

(21) Appl. No.: 15/908,078

(22) Filed: Feb. 28, 2018

(65) Prior Publication Data
US 2018/0262062 A1 Sep. 13, 2018

(30) Foreign Application Priority Data
Mar. 13, 2017 (JP) .................... 2017-047143

(51) Int. Cl.
*H02J 50/60* (2016.01)
*H02J 7/02* (2016.01)
*H02J 50/12* (2016.01)
*H02J 7/00* (2006.01)

(52) U.S. Cl.
CPC .............. *H02J 50/60* (2016.02); *H02J 7/025* (2013.01); *H02J 50/12* (2016.02); *H02J 2007/0001* (2013.01)

(58) Field of Classification Search
CPC .. H02J 50/60; H02J 50/12; H02J 7/025; H02J 2007/0001
See application file for complete search history.

(56) References Cited

U.S. PATENT DOCUMENTS

| 2009/0127936 A1* | 5/2009 | Kamijo .................. H02J 7/025 307/104 |
| 2016/0072307 A1 | 3/2016 | Kato |
| 2016/0087454 A1 | 3/2016 | Tanabe et al. |

OTHER PUBLICATIONS

Search Report dated Nov. 9, 2018, in corresponding European application No. 18 16 1506.3, 11 pages.

* cited by examiner

*Primary Examiner* — Robert L Deberadinis
(74) *Attorney, Agent, or Firm* — Foley & Lardner LLP

(57) ABSTRACT

A non-contact power transmission apparatus includes a non-contact power reception device, and a non-contact power supply device. The non-contact power supply device includes a power transmission coil, a power transmission circuit configured to transmit electric power by the power transmission coil, and a first control circuit configured to drive the power transmission circuit by using electric power of either a first voltage or a second voltage lower than the first voltage. The non-contact power reception device includes a power reception coil electromagnetically coupled with the power transmission coil, and a load circuit to which the electric power received by the power reception coil is supplied when connected to the power reception coil. The first control circuit carries out an authentication processing and a foreign object detection processing for detecting a foreign object before the load circuit and the power transmission coil are connected in the non-contact power reception device.

13 Claims, 7 Drawing Sheets

| CONDITION No. | TYPE OF FOREIGN OBJECT | ARRANGEMENT MANNER OF FOREIGN OBJECT | POWER TRANSMISSION CURRENT (mA) ||||| DETERMINATION ABOUT WHETHER FOREIGN OBJECT IS DETECTED ||||
|---|---|---|---|---|---|---|---|---|---|---|
| | | | AT DRIVING OF 5 V(Low) || AT DRIVING OF 19 V(High) || AT DRIVING OF 5 V(Low) || AT DRIVING OF 19 V(High) ||
| | | | NO POWER RECEPTION APPARATUS | PRESENCE OF POWER RECEPTION APPARATUS | NO POWER RECEPTION APPARATUS | PRESENCE OF POWER RECEPTION APPARATUS | NO POWER RECEPTION APPARATUS | PRESENCE OF POWER RECEPTION APPARATUS | NO POWER RECEPTION APPARATUS | PRESENCE OF POWER RECEPTION APPARATUS |
| (REFERENCE) | NONE | — | 23 | 26 | 117 | 110 | | | | |
| 1 | IC CARD A | CENTER | 60 | 58 | 172 | 164 | ○ | ○ | ○ | ○ |
| 2 | IC CARD A | SMALL POSITION DEVIATION | 40 | 43 | 144 | 139 | ○ | ○ | ○ | ○ |
| 3 | IC CARD A | LARGE POSITION DEVIATION | 41 | 41 | 147 | 141 | ○ | ○ | ○ | ○ |
| 4 | IC CARD B | CENTER | 28 | 32 | 160 | 154 | × | × | ○ | ○ |
| 5 | IC CARD B | SMALL POSITION DEVIATION | 28 | 40 | 160 | 160 | × | ○ | ○ | ○ |
| 6 | IC CARD B | LARGE POSITION DEVIATION | 40 | 45 | 179 | 172 | ○ | ○ | ○ | ○ |

FIG.6

NON-CONTACT POWER TRANSMISSION APPARATUS AND NON-CONTACT POWER SUPPLY DEVICE

CROSS-REFERENCE TO RELATED APPLICATION

This application claims the benefit of and priority to Japanese Patent Application No. 2017-047143, filed Mar. 13, 2017, the entire contents of which are incorporated herein by reference.

FIELD

Embodiments described herein relate generally to a non-contact power transmission apparatus and a non-contact power supply device.

BACKGROUND

A non-contact power transmission apparatus that transmits power in a non-contact manner is widespread. The non-contact power transmission apparatus includes a non-contact power supply device that supplies electric power and a non-contact power reception device that receives the electric power supplied from the non-contact power supply device. The non-contact power supply device supplies electric power to the non-contact power reception device in a state of being electromagnetically coupled with the non-contact power reception device by electromagnetic induction or magnetic field resonance. The non-contact power supply device has a charging pad provided with a power transmission coil. The non-contact power supply device supplies electric power to the non-contact power reception device placed on the charging pad by generating a magnetic field from the power transmission coil. The non-contact power reception device includes a rechargeable battery. The non-contact power reception device carries out a charging processing to store the electric power supplied from the non-contact power supply device in the rechargeable battery.

There is also a non-contact power transmission apparatus, which starts power transmission after carrying out an authentication processing with the non-contact power transmission apparatus and the non-contact power reception device. The non-contact power supply device executes the authentication processing with the non-contact power reception device placed on the charging pad by intermittently transmitting the electric power at low power. If the non-contact power supply device determines that the non-contact power reception device placed on the charging pad is a correct apparatus corresponding to the non-contact power supply device, by transmitting the electric power at normal power, the non-contact power supply device supplies the electric power to the non-contact power reception device placed on the charging pad.

In such a non-contact power transmission apparatus, it is assumed that there is a foreign object inserted between the charging pad of the non-contact power supply device and the non-contact power reception device. For example, in a case in which the foreign object is a conductor such as a metal, if the non-contact power supply device supplies the electric power to the non-contact power reception device placed on the charging pad, there is a possibility of generating an eddy current in the conductor and the conductor generates heat. If the foreign object is an electronic component with an antenna such as a non-contact IC card built therein, there is a possibility that the IC in the IC card is damaged by receiving the electric power by the antenna in the IC card. The electric power output from the power transmission coil of the non-contact power supply device is increased according to a load at a secondary side such as the non-contact power reception device and the foreign object. Therefore, the non-contact power supply device determines presence or absence of the foreign object by detecting a current flowing in the power transmission coil or a power transmission circuit. Furthermore, the non-contact power supply device detects the foreign object during the authentication processing and power transmission and stops the power transmission if the foreign object is detected.

The electric power absorbed by the foreign object increases in proportion to the electric power transmitted from the charging pad. For this reason, a detection accuracy of the foreign object increases as the electric power transmitted from the charging pad increases. However, if the non-contact power supply device carries out the authentication processing by intermittently transmitting the electric power at the low power as described above, there is a problem that the detection accuracy of the foreign object during the authentication processing is low.

If the non-contact power supply device determines that the non-contact power reception device placed on the charging pad is a correct device corresponding to the non-contact power supply device, and the non-contact power supply device transmits the electric power at the normal power if no foreign object is detected during the authentication processing, there is a problem that large electric power is supplied to the foreign object if there is a foreign object inserted between the charging pad of the non-contact power supply device and the non-contact power reception device.

DESCRIPTION OF THE DRAWINGS

FIG. 6 is a diagram illustrating a measurement result of a transmission current and a possibility of detecting foreign object in the non-contact power reception device according to some embodiments.

DETAILED DESCRIPTION

According to some embodiments, a non-contact power transmission apparatus comprises a non-contact power reception device, and a non-contact power supply device configured to transmit electric power to the non-contact power reception device. The non-contact power supply device includes a power transmission coil, a power transmission circuit configured to transmit electric power by the power transmission coil, and a first control circuit configured to drive the power transmission circuit by using electric power of either a first voltage or a second voltage lower than the first voltage. The non-contact power reception device includes a power reception coil electromagnetically coupled with the power transmission coil, and a load circuit to which the electric power received by the power reception coil is supplied when connected to the power reception coil. The first control circuit drives the power transmission circuit by using the electric power of the second voltage, carries out an authentication processing with the non-contact power reception device, drives the power transmission circuit by using the electric power of the first voltage if the authentication processing is successful, and carries out a foreign object detection processing for detecting a foreign object before the load circuit and the power transmission coil are connected in the non-contact power reception device.

Hereinafter, a non-contact power supply device, a non-contact power reception device, and a non-contact power transmission apparatus according to some embodiments will be described with reference to the accompanying drawings.

Figure 1:
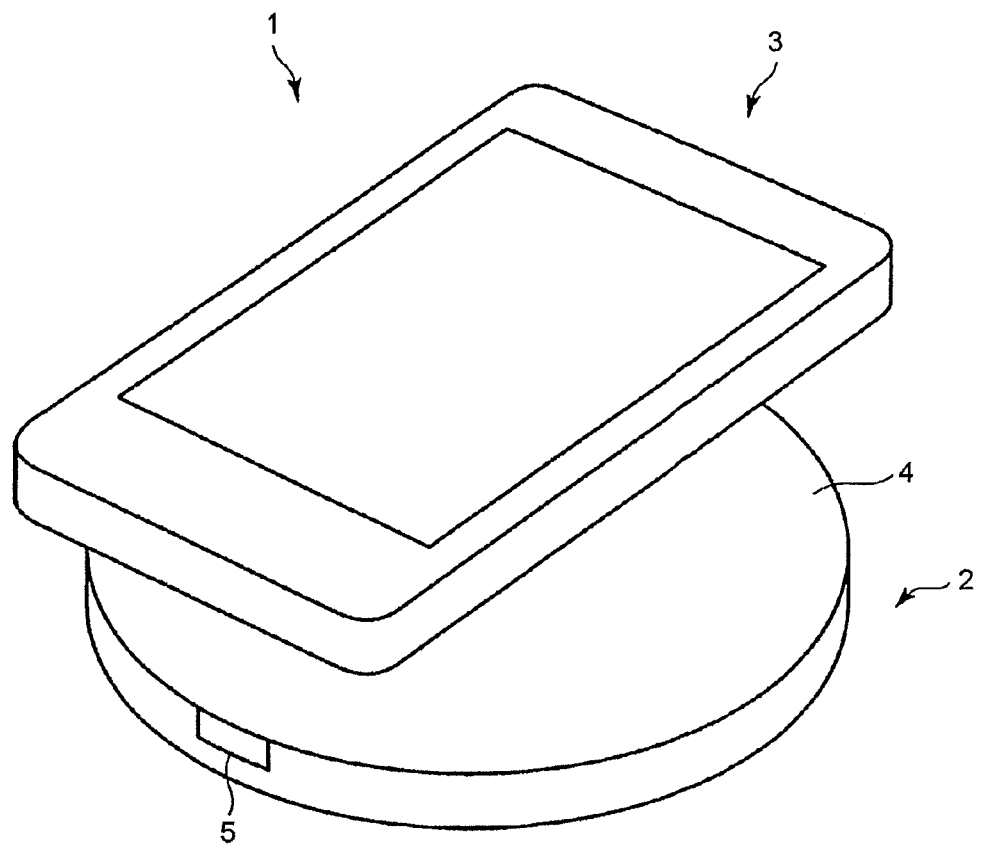
FIG. 1 is a diagram illustrating a configuration example of a non-contact power transmission apparatus according to some embodiments.

FIG. 1 is a diagram illustrating a configuration example of a non-contact power transmission apparatus 1 according to some embodiments.

The non-contact power transmission apparatus 1 includes a non-contact power supply device 2 that supplies electric power and a non-contact power reception device 3 that receives the electric power supplied from the non-contact power supply device 2.

The non-contact power supply device 2 supplies the electric power to the non-contact power reception device 3 in a state of being electromagnetically coupled with the non-contact power reception device 3 by electromagnetic induction or magnetic field resonance. The non-contact power supply device 2 includes a charging pad 4 and a display section 5. Apart of a housing of the non-contact power supply device 2 is formed into a flat plate shape to form the charging pad 4, and a power transmission coil (not shown) is provided in the charging pad 4. The display section 5 is an indicator (such as an LED or display) indicating a state of the non-contact power supply device 2.

The non-contact power reception device 3 receives the electric power transmitted from the non-contact power supply device 2. The non-contact power reception device 3 is a portable information terminal such as a smartphone, a tablet PC, or the like. The non-contact power reception device 3 includes a power reception coil (not shown) and a rechargeable battery. The power reception coil is provided on either surface of a housing of the non-contact power reception device 3. If the non-contact power reception device 3 is placed in a state in which the surface on which the power reception coil is provided is directed to the charging pad 4 in the housing of the non-contact power reception device 3, the reception coil is electromagnetically coupled with the power transmission coil of the non-contact power supply device 2. The rechargeable battery stores electric power and supplies the electric power to the non-contact power reception device 3.

The non-contact power supply device 2 supplies the electric power to the non-contact power reception device 3 placed on the charging pad 4. For example, by generating a magnetic field with the power transmission coil, the non-contact power supply device 2 transmits the electric power to the non-contact power reception device 3 via the power reception coil electromagnetically coupled with the power transmission coil.

The power reception coil of the non-contact power reception device 3 generates an induced current by a magnetic field output from the power transmission coil of the non-contact power supply device 2. The non-contact power reception device 3 executes a charging processing for storing the electric power generated in the power reception coil in the rechargeable battery.

Figure 2:
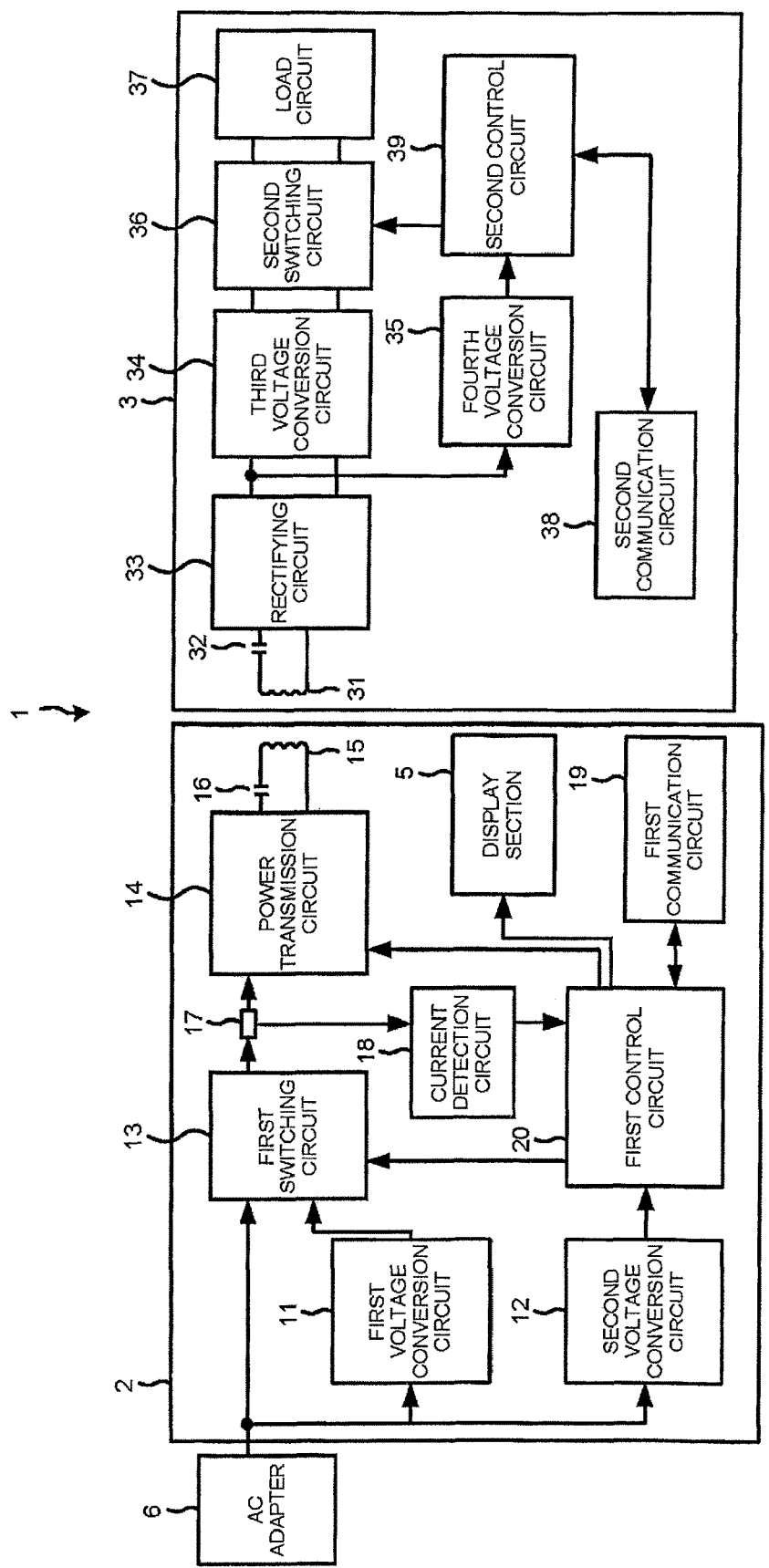
FIG. 2 is a diagram illustrating a configuration example of a non-contact power supply device and a non-contact power reception device of the non-contact power transmission apparatus according to some embodiments.

FIG. 2 is a diagram illustrating a configuration example of the non-contact power supply device 2 and the non-contact power reception device 3 of the non-contact power transmission apparatus 1 according to some embodiments.

DC power of a first voltage is supplied to the non-contact power supply device 2 from a commercial power source via a DC power source such as an AC adapter 6. Specifically, a DC power source of 19V is supplied from the AC adapter 6 to the non-contact power supply device 2. By the DC power source, the non-contact power supply device 2 operates in one of a number of operation states including a power transmission state in which normal power is continuously supplied to the non-contact power reception device 3, and a standby state in which low power is intermittently transmitted.

(About the Non-Contact Power Supply Device 2)

The non-contact power supply device 2 includes a first voltage conversion circuit 11, a second voltage conversion circuit 12, a first switching circuit 13, a power transmission circuit 14, a power transmission coil 15, a first capacitor 16, a current sensor 17, a current detection circuit 18, a display section 5, a first communication circuit 19, and a first control circuit 20.

The first voltage conversion circuit 11 converts a DC power of the first voltage supplied from an external DC power source to a DC power of a second voltage lower than the first voltage. The first voltage conversion circuit 11 supplies the DC power of the second voltage to the first switching circuit 13. The second voltage is used for enabling the non-contact power supply device 2 to operate in the standby state. Specifically, the first voltage conversion circuit 11 converts the DC power of 19 V supplied from the AC adapter 6 to a DC power of 5 V.

The second voltage conversion circuit 12 converts the DC power of the first voltage supplied from an external DC power source to a DC power of a third voltage lower than the first voltage. The second voltage conversion circuit 12 supplies the DC power of the third voltage to the first control circuit 20. The third voltage enables the first control circuit 20 to operate. Specifically, the second voltage conversion circuit 12 converts the DC power of 19 V supplied from the AC adapter 6 to a DC power of 3.3 V. if the first control circuit 20 is operable by the DC power of the second voltage, the second voltage conversion circuit 12 may be omitted and the first voltage conversion circuit 11 may supply the DC power of 5 V to the first control circuit 20.

The first switching circuit 13 selectively switches the DC power to be supplied to the power transmission circuit 14. For example, the first switching circuit 13 supplies either the DC power of the first voltage supplied from the external DC power source or the DC power of the second voltage obtained by stepping down the DC power supplied from the external DC power source by the first voltage conversion circuit 11 to the power transmission circuit 14. The first switching circuit 13 switches the DC power to be supplied to the power transmission circuit 14 under the control of the first control circuit 20.

The power transmission circuit 14 generates AC power based on the DC power supplied from the first switching circuit 13 and then supplies the AC power to the power transmission coil 15. For example, if an electromagnetic induction system is used for power transmission, the power transmission circuit 14 supplies an AC power of about 100 kHz-200 kHz to the power transmission coil 15. For example, if a magnetic field resonance system is used for power transmission, the power transmission circuit 14 supplies an AC power in a MHz band such as 6.78 MHz or 13.56 MHz to the power transmission cell 15. A frequency of the AC power to be supplied to the power transmission coil 15 by the power transmission circuit 14 is not limited to the above and may be optional as long as it corresponds to the power transmission system. The frequency of the AC power supplied to the power transmission coil 15 by the power transmission circuit 14 may be changed according to a specification of the non-contact power reception device 3.

The power transmission coil 15 is connected in series with the first capacitor 16. The first capacitor 16 is a capacitor for resonance. By connecting the power transmission coil 15 and the first capacitor 16, a resonance circuit is formed. The power transmission coil 15 generates a magnetic field by the AC power supplied from the power transmission circuit 14.

The current sensor 17 is a minute resistance connected between the first switching circuit 13 and the power transmission circuit 14. The current sensor 17 generates a potential (current detection signal) corresponding to the current transmitted from the first switching circuit 13 to the power transmission circuit 14.

The current detection circuit 18 amplifies the current detection signal generated in the current sensor 17 and supplies it to the first control circuit 20.

The display section 5 is an indicator indicating a state of the non-contact power supply device 2. The display section 5 switches the display under the control of the first control circuit 20. For example, the display section 5 switches a display color according to an operation state of the non-contact power supply device 2. For example, the display section 5 may switch the display color according to a result of a foreign object detection processing. Alternatively, the display section 5 may display the operation state with a message.

The first communication circuit 19 is used for performing wireless communication with the non-contact power reception device 3. The first communication circuit 19 performs wireless communication at a frequency different from the frequency of power transmission. The first communication circuit 19 may be, for example, a wireless LAN using a 2.4 GHz or 5 GHz band, a short distance wireless communication device using the 920 MHz band, or the like. Specifically, the first communication circuit 19 performs the wireless communication with the non-contact power reception device 3 according to a standard such as Bluetooth (registered trademark) or Wi-Fi (registered trademark). The first communication circuit 19 may execute a signal processing for performing load modulation on a carrier wave for the power transmission to perform communication with the non-contact power reception device 3.

The first control circuit 20 controls the operations of the display section 5, the first switching circuit 13, the power transmission circuit 14, and the first communication circuit 19, respectively. For example, the first control circuit 20 switches a display on the display section 5 according to a state of the non-contact power supply device 2. The first control circuit 20 controls switching in the first switching circuit 13. The first control circuit 20 controls the frequency of the AC power output from the power transmission circuit 14 and controls ON or OFF of the operation of the power transmission circuit 14. Further, the first control circuit 20 controls the communication with the non-contact power reception device 3 via the first communication circuit 19.

The first control circuit 20 includes an arithmetic element and a memory. The arithmetic element executes an arithmetic processing. For example, the arithmetic element executes various processing based on a program and data used in the program stored in the memory. The memory stores the program and the data used in the program. The first control circuit 20 may be composed of a microcomputer and or an oscillation circuit.

(About Authentication Processing)

By communicating with the non-contact power reception device 3 via the first communication circuit 19, the first control circuit 20 executes the authentication processing with the non-contact power reception device 3. The authentication processing is a processing of determining whether or not the non-contact power reception device 3 placed on the charging pad 4 is a correct device. Specifically, the first control circuit 20 acquires information indicating identification information of the non-contact power reception device 3, a model number, a corresponding power transmission system, and a corresponding frequency as authentication information from the non-contact power reception device 3 via the first communication circuit 19. The authentication information may be only the identification information of the non-contact power reception device 3, or may be other information. The first control circuit 20 compares the acquired authentication information with the information recorded in the memory so as to determine whether or not the non-contact power reception device 3 placed on the charging pad 4 is the correct device to which the electric power can be supplied by the power supply device 2

(About Arrangement Detection Processing)

Based on the current detection signal supplied from the current detection circuit 18, the first control circuit 20 executes an arrangement detection processing of determining whether or not the non-contact power reception device 3 which is a power supply object is arranged on the charging, pad 4. For example, the first control circuit 20 determines that a non-contact power reception device 3 is placed on the charging pad 4 if there is a change in the current detection signal in the power transmission in the standby state in which power transmission is performed intermittently.

(About Foreign Object Detection Processing)

The first control circuit 20 carries out the foreign object detection processing to detect the presence or absence of the foreign object based on the current detection signal supplied from the current detection circuit 18. The foreign object detection processing is a processing of determining whether or not there is a foreign object including a conductor which is not the power supply object on the charging pad 4. The foreign object may be an object obtained by exposing a conductor such as a clip or the like, or an object obtained by housing the conductor in a housing such as a resin like a non-contact IC card. If there is the foreign object on the charging pad 4, a part of the electric power output from the power transmission coil 15 is absorbed by the foreign object. Therefore, the current flowing to the power transmission circuit 14 increases. Therefore, the first control circuit 20 determines that there is the foreign object on the charging pad 4 when the current detection signal is equal to or greater than a preset threshold value.

The threshold value used for the foreign object detection processing is set according to a driving state of the power transmission circuit 14 during the foreign object detection processing and a load at the secondary side. For example, if the power transmission circuit 14 is supplied with the DC power of the second voltage, and the non-contact power reception device 3 is placed on the charging pad 4, the first control circuit 20 uses a first threshold value for the foreign object detection processing. The foreign object detection processing using the first threshold value is referred to as a first foreign object detection processing. For example, if the power transmission circuit 14 is supplied with the DC power of the first voltage and the charging processing is not executed in the non-contact power reception device 3, the first control circuit 20 uses a second threshold value greater than the first threshold value for the foreign object detection processing. The foreign object detection processing using the second threshold value is referred to as a second foreign object detection processing. For example, if the power transmission circuit 14 is supplied with the DC power of the first voltage and the charging processing is being executed in the non-contact power reception device 3, the first control circuit 20 uses a third threshold value greater than the second threshold value for the foreign object detection processing. The foreign object detection processing using the third threshold value is referred to as a third foreign object detection processing.

If the charging processing is executed in the non-contact power reception device 3, the first control circuit 20 may determine where there is the foreign object by comparing the current detection signal in the state in which there is no foreign object and an actual current detection signal.

If the charging processing is being executed in the non-contact power reception device 3, the first control circuit 20 may acquire a power value at which the electric power is received by the non-contact power reception device 3 from the non-contact power reception device 3, calculate a power transmission efficiency based on a power value at which the non-contact power supply device 2 transmits the electric power and the power value at which the electric power is received by the non-contact power reception device 3, and determine the presence or absence of the foreign object based on the calculated power transmission efficiency. According to such a configuration, if the calculated power transmission efficiency is equal to or smaller than a preset threshold value, the first control circuit 20 detects that the power transmission efficiency decreases due to presence of the foreign object or a position shift of the non-contact power reception device 3 on the charging pad 4.

(About the Non-Contact Power Reception Device 3)

The non-contact power reception device 3 includes a power reception coil 31, a second capacitor 32, a rectifying circuit 33, a third voltage conversion circuit 34, a fourth voltage conversion circuit 35, a second switching circuit 36, a load circuit 37, a second communication circuit 38, and a second control circuit 39.

The power reception coil 31 is connected in series with the second capacitor 32. The second capacitor 32 is a capacitor for resonance. A connection between the power reception coil 31 and the second capacitor 32 constitutes a resonance circuit. If the non-contact power reception device 3 is placed on the charging pad 4 of the non-contact power supply device 2, the power reception coil 31 is electromagnetically coupled with the power transmission coil 15 of the non-contact power supply device 2. The power reception coil 31 generates an induced current by the magnetic field output from the power transmission coil 15 of the non-contact power supply device 2. The resonance circuit constituted by the power reception coil 31 and the second capacitor 32 functions as an AC power source for supplying AC power to the rectifying circuit 33 connected to the resonance circuit.

For example, if the magnetic resonance system is used for the power transmission, it is desired that a self resonance frequency of the power reception resonance circuit constituted by the power reception coil 31 and the second capacitor 32 is the same as or almost the same as that of the power transmission resonance circuit constituted by the power transmission coil 15 and the first capacitor 16 of the non-contact power supply apparatus 2. In this way, the power transmission efficiency is improved when the power reception resonance circuit and the power transmission resonance circuit are electromagnetically coupled.

When the electromagnetic induction system is used for the power transmission, the first capacitor 16 connected to the power transmission coil 15 or the second capacitor 32 connected to the power reception coil 31 may be omitted.

However, by connecting the first capacitor 16 to the power transmission coil 15 and connecting the second capacitor 32 to the power reception coil 31, the power transmission efficiency can be improved. In this way, a maximum transmission distance between the power transmission coil 15 and the power reception coil 31 can be extended. The first capacitor 16 and the second capacitor 32 are connected in series with the power transmission coil 15 and the power reception coil 31, respectively; however, the present invention is not limited to this constitution. The first capacitor 16 and the second capacitor 32 may be connected in parallel to the power transmission coil 15 and the power reception coil 31, respectively.

The rectifying circuit 33 rectifies the AC power supplied from the power reception resonance circuit and converts it to DC power. The rectifying circuit 33 includes, for example, a rectifying bridge constituted by a plurality of diodes. A pair of input terminals of the rectifier bridge is connected to the power reception resonance circuit. The rectifying circuit 33 outputs the DC power from a pair of output terminals by full-wave rectifying the AC power supplied from the power reception resonance circuit. The third voltage conversion circuit 34 and the fourth voltage conversion circuit 35 are connected to the pair of output terminals of the rectifying circuit 33. The rectifying circuit 33 supplies the DC power to the third voltage conversion circuit 34 and the fourth voltage conversion circuit 35, respectively.

The third voltage conversion circuit 34 converts the DC power supplied from the rectifying circuit 33 to a DC power of a fourth voltage used for the charging processing. The third voltage conversion circuit 34 supplies the DC power of the fourth voltage to the second switching circuit 36.

The fourth voltage conversion circuit 35 converts the DC power supplied from the rectifying circuit 33 to a DC power of a fifth voltage which is a voltage for enabling the second control circuit 39 to operate. The fourth voltage conversion circuit 35 supplies the DC power of the fifth voltage to the second control circuit 39.

The second switching circuit 36 switches between a state of supplying the DC power of the fourth voltage from third voltage conversion circuit 34 to the load circuit 37 and a state of not supplying the DC power of the fourth voltage. For example, the second switching circuit 36 switches between a state in which the third voltage conversion circuit 34 and the load circuit 37 are connected, and a state in which the third voltage conversion circuit 34 and the load circuit 37 are disconnected. The second switching circuit 36 performs the switching under the control of the second control circuit

39. The second switching circuit 36 may be, for example, a MOSFET switch or a relay switch.

The load circuit 37 receives the DC power of the fourth voltage generated by the third voltage conversion circuit 34. The load circuit 37 may be, for example, the rechargeable battery and the charging circuit for charging the electric power to the rechargeable battery. The load circuit 37 executes the charging processing of storing the DC power of the fourth voltage generated by the third voltage conversion circuit 34 in the rechargeable battery. The electric power stored in the rechargeable battery is used for operation of various circuits (not shown) of the non-contact power reception device 3. The load circuit 37 may be provided at the outside of the non-contact power reception device 3. In this case, instead of the load circuit 37, the non-contact power reception device 3 may have an output terminal for supplying the electric power to the external load circuit via a connector or a cable.

The second communication circuit 38 is used for executing wireless communication with the non-contact power supply device 2. The second communication circuit 38 executes the wireless communication at a frequency different from the power transmission frequency. The second communication circuit 38 may be, for example, a wireless LAN using the 2.4 GHz or 5 GHz band, a short distance wireless communication apparatus using the 920 MHz band, or the like. Specifically, the second communication circuit 38 conforms to a standard such as Bluetooth (registered trademark) or Wi-Fi (registered trademark) to perform the wireless communication with the non-contact power supply device 2. The second communication circuit 38 may carry out a signal processing for performing the load modulation on a carrier wave of the power transmission and performing the communication with the non-contact power supply device 2.

The second control circuit 39 controls the operations of the second switching circuit 36 and the second communication circuit 38, respectively. For example, the second control circuit 39 controls the switching in the second switching circuit 36. The second control circuit 39 controls the switching in the second switching circuit 36 so that the load circuit 37 switches between a state of executing the charging processing and a state of not executing the charging processing. The second control circuit 39 controls the communication with the non-contact power Supply device 2 via the second communication circuit 38.

The second control circuit 39 includes an arithmetic element and a memory. The arithmetic element executes an arithmetic processing. The arithmetic element carries out various processing based on, for example, a program and data used in the program stored in the memory. The memory stores the program and the data used in the program. The second control circuit 39 may be composed of a microcomputer and/or an oscillation circuit.

(About the Authentication Processing)

By communicating with the non-contact power supply device 2 via the second communication circuit 38, the second control circuit 39 carries out the authentication processing with the non-contact power supply device 2. The memory of the second control circuit 39 stores the information indicating the identification information of the non-contact power reception device 3, the model number, the corresponding power transmission system, the corresponding frequency, and the like. If the second control circuit 39 receives a specific control signal from the non-contact power supply device 2 via the second communication circuit 38, the second control circuit 39 reads out the information indicating the identification information of the non-contact power reception device 3, the model number, the corresponding power transmission system, the corresponding frequency, and the like from the memory, and transmits it to the non-contact power supply device 2 as authentication information. Thus, in the non-contact power supply device 2, it is determined whether the non-contact power reception device 3 is a correct device.

Next, the operations of the non-contact power supply device 2 and the non-contact power reception device 3 having the above configuration are described.

Figure 3:
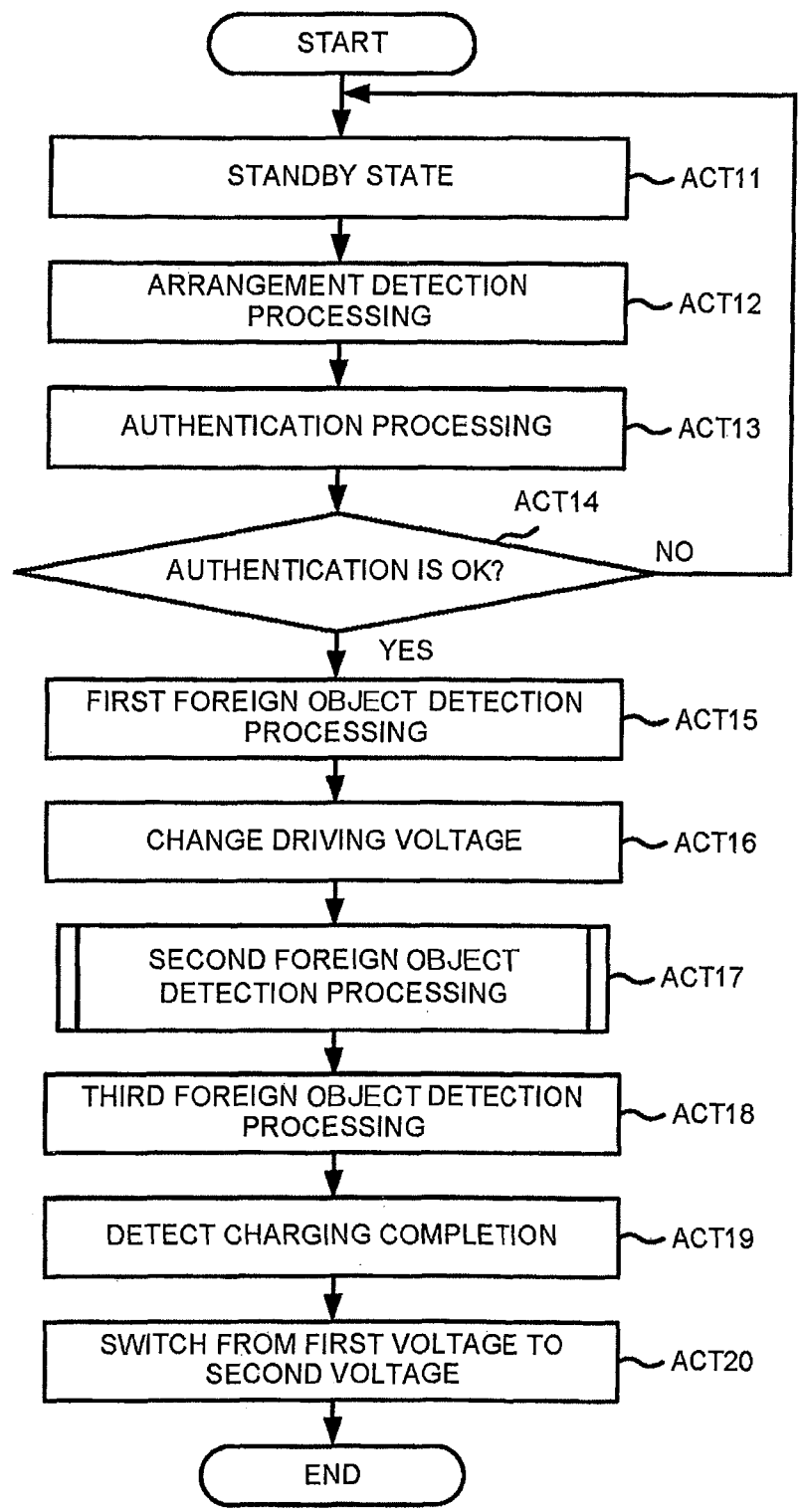
FIG. 3 is a diagram illustrating an example of operations of the non-contact power supply device according to some embodiments.

FIG. 3 is a flowchart illustrating, an example of the operation of the non-contact power supply device 2.

When started, the non-contact power supply device 2 operates in a standby state (ACT 11). At this time, the first control circuit 20 of the non-contact power supply device 2 switches the first switching circuit 13 so as to supply the DC power of the second voltage from the first voltage conversion circuit 11 to the power transmission circuit 14. Further, the first control circuit 20 performs control so that the power transmission circuit 14 operates at regular intervals. As a result, the first control circuit 20 intermittently transmits lower power than that in the power transmission state from the power transmission coil 15. In this manner, power saving can be realized by intermittently driving the power transmission circuit 14 according to the output of the first voltage conversion circuit 11. Since the electric power lower than that in the normal power transmission state is transmitted from the power transmission coil 15, radiation noise can be reduced as compared with the normal power transmission state.

The first control circuit 20 performs an arrangement detection processing while intermittently transmitting the electric power (ACT 12). As a result, the first control circuit 20 confirms whether or not the non-contact power reception device 3 is placed on the charging pad 4. For example, if there is a change in the current detection signal supplied from the current detection circuit 18, the first control circuit 20 determines that a power reception device is placed on the charging pad 4.

If it is determined that the non-contact power reception device 3 is placed on the charging pad 4, the first control circuit 20 carries out the authentication processing (ACT 13). The first control circuit 20 performs control to transmit a specific control signal to the non-contact power reception device 3 placed on the charging pad 4, so as to acquire the authentication information from the non-contact power reception device 3.

The first control circuit 20 determines whether the authentication is normally carried out (whether authentication is OK) or whether the authentication is not normally carried out (ACT 14). In other words, based on the authentication information acquired from the non-contact power reception device 3, the first control circuit 20 determines whether the non-contact power reception device 3 is the correct device to which the electric power can be supplied by the non-contact power supply device 2. If it is determined that the authentication is not successful (No in ACT 14), the first control circuit 20 proceeds to the processing in ACT 11. If it is determined that the authentication is not successful, the first control circuit 20 may inform that the authentication is not successful with the display section 5 or other means. If it is determined that the authentication is OK, the first control circuit 20 may transmit that the authentication is OK to the non-contact power reception device 3.

If it is determined that the authentication is OK (Yes in ACT 14), the first control circuit 20 carries out the first foreign object detection processing (ACT 15). The first foreign object detection processing is carried out by using the first threshold value. The first control circuit 20 determines that there is the foreign object if the current detection signal supplied from the current detection circuit 18 is greater than or equal to the preset first threshold value. If it is determined that there is the foreign object, the first control circuit 20 stops the power transmission without raising the voltage of the DC power to be supplied to the power transmission circuit 14 from the second voltage to the first voltage. Further, if it is determined that there is the foreign object, the first control circuit 20 notifies that there is the foreign object with the display section 5 or other means. If the foreign object is not detected in the first foreign object detection processing, the first control circuit 20 proceeds to the processing in ACT 16.

If the foreign object is not detected in the first foreign object detection processing, the first control circuit 20 changes the driving voltage of the power transmission circuit 14 (ACT 16). For example, the first control circuit 20 controls the first switching circuit 13 to change from the state in which the DC power from the first voltage conversion circuit 11 is supplied to the power transmission circuit 14 to a state in which the DC power from an external device is supplied to the power transmission circuit 14. As a result, the first control circuit 20 raises the voltage of the DC power to be supplied to the power transmission circuit 14 from the second voltage (for example, 5 V) to the first voltage (for example, 19 V). At this stage, since the charging processing is not started in the non-contact power reception device 3, i.e., since the load circuit 37 is not connected to the power reception coil 31 (or the third voltage conversion circuit 34), large power for charging the rechargeable battery is not transmitted.

Next, the first control circuit 20 carries out a second foreign object detection processing (ACT 17). The second foreign object detection processing is carried out by using the second threshold value.

Figure 4:
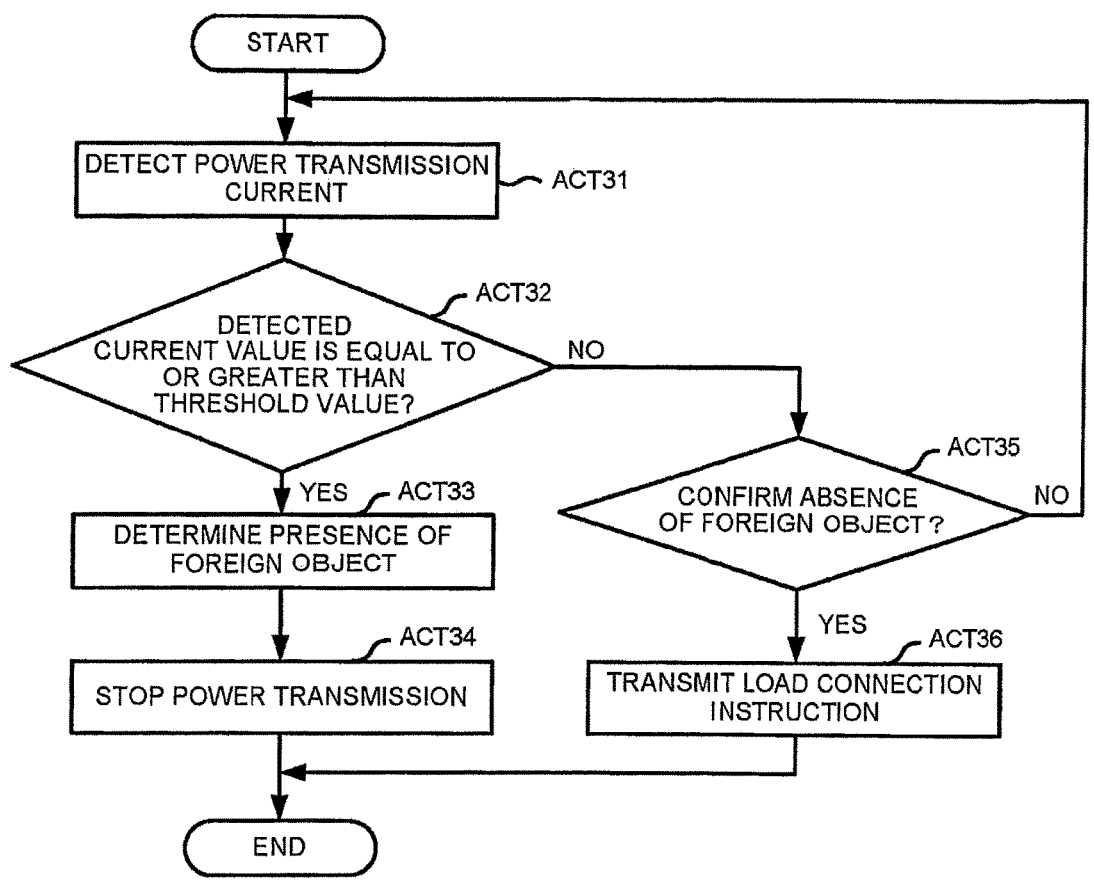
FIG. 4 is a diagram illustrating an example of operations of the non-contact power supply device according to some embodiments.

FIG. 4 is a flowchart illustrating an example of the second foreign object detection processing executed by the first control circuit 20.

The non-contact power supply device 2 detects a transmission current to the power transmission circuit 14 by the current sensor 17 and the current detection circuit 18 (ACT 31).

The first control circuit 20 determines whether or not the current detection signal supplied from the current detection circuit 18 is equal to or greater than the preset second threshold value (ACT 32).

If it is determined that the current detection signal supplied from the current detection circuit 18 is equal to or greater than a preset threshold value (Yes in ACT 32), the first control circuit 20 determines that there is the foreign object (ACT 33).

If it is determined that there is the foreign object, the first control circuit 20 stops supplying the DC power to the power transmission circuit 14 so as to stop the power transmission from the power transmission coil 15 (ACT 34), and ends the second foreign object detection processing. If the first control circuit 20 detects the foreign object in the second foreign object detection processing, the first control circuit 20 notifies that there is the foreign object with the display section 5 or other means. The first control circuit 20 may lower the voltage of the DC power to be supplied to the power transmission circuit 14 to the second voltage from the first voltage if it is determined that there is the foreign object.

If the first control circuit 20 determines that the current detection signal supplied from the current detection circuit 18 in ACT 32 is not equal to or greater than the preset threshold value (No in ACT 32), the first control circuit 20 determines that there is no foreign object (ACT 35). For example, the first control circuit 20 confirms the determination that there is no foreign object if the foreign object is not detected for a preset time interval after starting the second foreign object detection processing. If the number of times of the determination that the foreign object is not detected since the start of the second foreign object detection processing reaches a preset number of times, the first control circuit 20 may determine the absence of the foreign object. The first control circuit 20 proceeds to the processing in ACT 31 if the determination of the absence of the foreign object is not confirmed (No in ACT 35).

If the determination of the absence of the foreign object is confirmed (Yes in ACT 35), the first control circuit 20 transmits a signal (load connection instruction) instructing connection of a load circuit to the non-contact power reception device 3 (ACT 36), and ends the second foreign object detection processing. The first control circuit 20 controls the non-contact power reception device 3 to start the charging processing in a case in which no foreign object is detected even if the driving voltage of the power transmission circuit 14 is increased from the second voltage (e.g., 5 V) to the first voltage (e.g., 19 V).

If no foreign object is detected in the second foreign object detection processing, and the non-contact power reception device 3 is instructed to start the charging, the first control circuit 20 carries out a third foreign object detection processing while maintaining the driving voltage of the power transmission circuit 14 at the first voltage (ACT 18). The third foreign object detection processing is carried out by using the third threshold value. If the load circuit 37 is connected in the non-contact power reception device 3, a circuit which is a load at the secondary side if viewed from the non-contact power supply device 2 is increased. Therefore, the current flowing to the power transmission circuit 14 increases in comparison with a case in which the load circuit 37 is not connected in the non-contact power reception device 3. Therefore, if the charging processing is carried out in the non-contact power reception device 3, the first control circuit 20 uses the third threshold value greater than the second threshold value to carry out the third foreign object detection processing.

The first control circuit 20 determines that there is the foreign object if the current detection signal supplied from the current detection circuit 18 is greater than or equal to the preset third threshold value. If it is determined that there is the foreign object, the first control circuit 20 lowers the voltage of the DC power to be supplied to the power transmission circuit 14 from the first voltage to the second voltage, or stops supplying the DC power to the power transmission circuit 14, thereby stopping the power transmission. If it is determined that there is the foreign object, the first control circuit 20 notifies that there is the foreign object with the display section 5 or other means. If no foreign object is detected in the third foreign object detection processing, the first control circuit 20 proceeds to the processing in ACT 19 while transmitting the electric power to the non-contact power reception device 3.

The first control circuit 20 detects completion of the charging processing in the non-contact power reception device 3 (ACT 19). For example, if the first control circuit 20 receives information indicating that the charging processing is completed from the non-contact power reception device 3, the first control circuit 20 determines that the charging processing is completed. If the charging processing is completed in the non-contact power reception device 3, the load circuit 37 is released from the third voltage conversion circuit. Therefore, the current flowing to the power transmission circuit 14 decreases. If the first control circuit 20 detects the decrease in the current flowing to the power transmission circuit 14 based on the current detection signal from the current detection circuit 18, the first control circuit 20 may determine that the charging processing is completed.

If the first control circuit 20 detects completion of the charging processing in the non-contact power reception device 3, the first control circuit 20 lowers the voltage of the DC power to be supplied to the power transmission circuit 14 from the first voltage to the second voltage (ACT 20), and ends the processing. If the first control circuit 20 detects completion of the charging processing in the non-contact power reception device 3, the first control circuit 20 may lower the voltage of the DC power to be supplied to the power transmission circuit 14 from the first voltage to the second voltage, and then proceeds to the processing in ACT 11.

Figure 5:
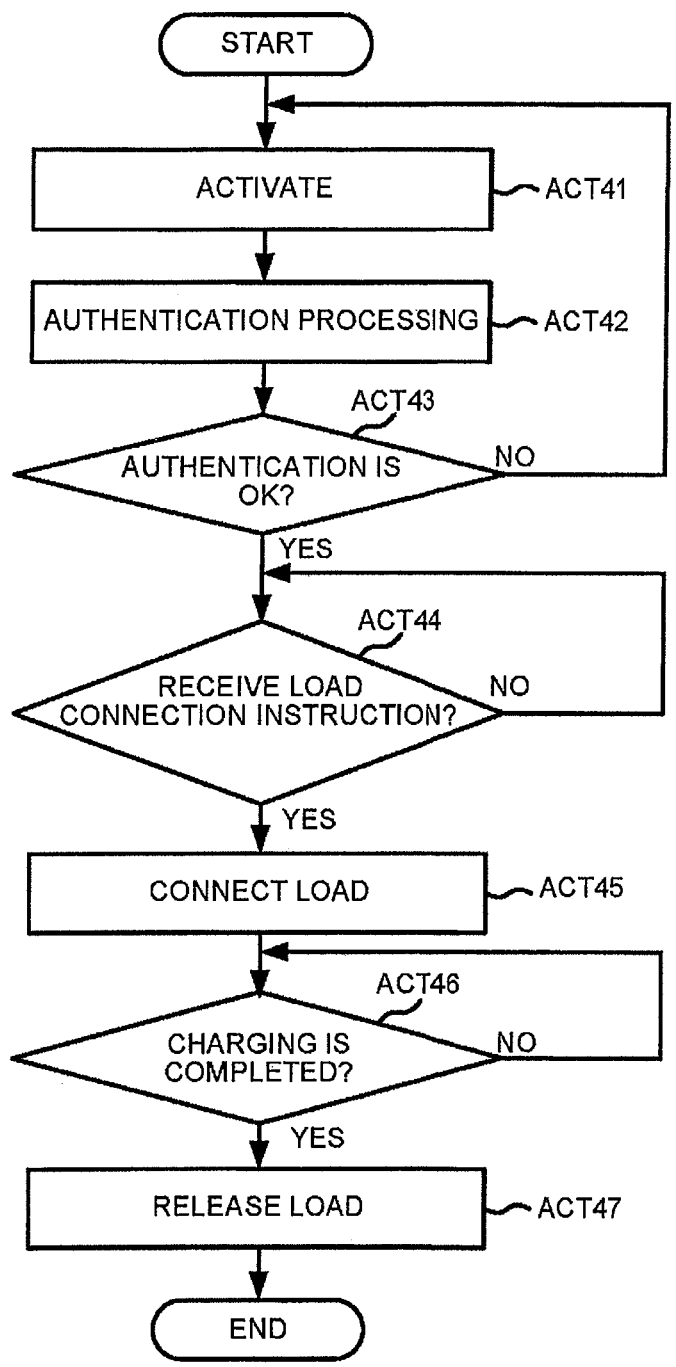
FIG. 5 is a diagram illustrating an example of operations of the non-contact power reception device according to some embodiments.

FIG. 5 is a flowchart illustrating an example of the operation of the non-contact power reception device 3.

When placed on the charging pad 4 of the non-contact power supply device 2, the non-contact power reception device 3 is started by the electric power supplied from the non-contact power supply device 2 (ACT 41). When started, the second control circuit 39 of the non-contact power reception device 3 controls the second switching circuit 36 so as to release the load circuit 37 from the third voltage conversion circuit 34.

When started, the second control circuit 39 carries out the authentication processing with the non-contact power reception device 3 (ACT 42). For example, the second control circuit 39 transmits the authentication information to the non-contact power supply device 2 in response to a control signal from the non-contact power supply device 2.

The second control circuit 39 determines whether or not the authentication is OK in the non-contact power supply device 2 (ACT 43). For example, if the second control circuit 39 receives the information indicating that the authentication is OK from the non-contact power supply device 2, the second control circuit 39 determines that the authentication is OK in the non-contact power supply device 2. The second control circuit 39 may include a circuit for detecting whether or not the electric power supplied from the non-contact power supply device 2 is increased. If the electric power supplied from the non-contact power supply device 2 is increased, the second control circuit 39 determines that the authentication is OK in the non-contact power supply device 2. If the second control circuit 39 determines that the authentication is not successful in the non-contact power supply device 2 (No in ACT 43), the second control circuit 39 proceeds to the processing in ACT 41.

If it is determined that the authentication is OK in the non-contact power supply device 2 (Yes in ACT 43), the second control circuit 39 determines whether or not the load connection instruction is received from the non-contact power supply device 2 (ACT 44). If it is determined that the load connection instruction is received from the non-contact power supply device 2 (Yes in ACT 44), the second control circuit 39 controls the second switching circuit 36 so as to connect the load circuit 37 to the third voltage conversion circuit 34 (ACT 45). Thus, the second control circuit 39 starts the charging processing to the load circuit 37.

The second control circuit 39 may connect the load circuit 37 to the third voltage conversion circuit 34 according to the elapsed time since the electric power supplied from the non-contact power supply device 2 is increased. For example, if the elapsed time since the electric power supplied from the non-contact power supply device 2 reaches a preset time, the second control circuit 39 connects the load circuit 37 to the third power conversion circuit 34. The second control circuit 39 may proceed to the processing in ACT 41 if the electric power supplied from the non-contact power supply device 2 is decreased before the elapsed time since the increase of the electric power supplied from the non-contact power supply device 2 reaches the preset time. The second control circuit 39 may connect the load circuit 37 to the third power conversion circuit 34 after a certain time elapses since the non-contact power reception device 3 is started in ACT 41 and the second control circuit 39 starts operating.

During the charging processing, the second control circuit 39 determines whether or not the charging is completed (ACT 46). The rechargeable battery and a charging circuit which are the load circuit 37 supply information indicating that they are in a fully charged state to the second control circuit 39. If the second control circuit 39 receives the information indicating that they are in the fully charged state, the second control circuit 39 determines that the charging is completed. Alternatively, the second control circuit 39 may detect a charging current and a charging voltage to the rechargeable battery to detect the fully charged state.

If it is determined that the charging is completed (Yes in ACT 46), the second control circuit 39 releases the load circuit 37 from the third voltage conversion circuit 34 (ACT 47), and ends the processing. As a result, the second control circuit 39 terminates the charging processing to the load circuit 37.

FIG. 6 is a diagram illustrating measurement results of the transmission current to the power transmission circuit 14 and whether the foreign object can be detected when the driving voltage of the power transmission circuit 14, the type of the foreign object, and the arrangement position of the non-contact power reception apparatus 3 on the charging pad 4 are changed by using the non-contact power transmission apparatus 1. The non-contact power transmission apparatus 1 transmits the electric power from the power transmission coil 15 to the power reception coil 31 by generating the AC power with a frequency of 6.78 MHz with the power transmission circuit 14. If 6.78 MHz is used, the double frequency of the harmonics becomes 13.56 MHz. For this reason, it is known to affect an IC card corresponding to 13.56 MHz. Therefore, as the foreign object, two kinds of contactless IC cards (IC card A and IC card B) corresponding to 13.56 MHz are used.

First, in the absence of the foreign object, the transmission current at the driving of 5 V which is the second voltage is 23 mA (when there is no power reception device) or 26 mA (when there is the power reception device). The transmission current at the driving of 19 V which is the first voltage is 117 mA (when there is no power reception device) or 110 mA (when there is the power reception device). The above measurement is carried out with the load circuit 37 of the non-contact power reception device 3 released from the third voltage conversion circuit 34. The non-contact power supply device 2 carries out the foreign object detection processing based on these transmission currents.

Further, measurement results for a case in which the IC card A or the IC card B is placed at the center of the charging pad 4 of the non-contact power supply device 2, a case (small position deviation) in which the position of the IC card A or the IC card B is deviated by about 10 mm from the center of the charging pad 4, and a case (large position deviation) in which the position of the IC card A or the IC card B is deviated by about 20 mm from the center of the charging pad 4 are respectively listed in columns of the transmission current (mA) as conditions No. 1 to 6.

If the IC card A or the IC card B which is the foreign object is placed in a state of being sandwiched between the charging pad 4 and the non-contact power reception device 3, in most cases, the transmission current is increased to be greater than a reference value. From the measurement result, it can be confirmed that an increase amount of the transmission current with respect to the presence and absence of the foreign object at the driving of 5 V is larger than that at the driving of 19 V. At the driving of 5 V, depending on the type and arrangement manner of the IC card, like condition No. 4 or 5, it can be confirmed from the measurement result that there is a case in which the increase amount of the transmission current is not increased much from the reference value.

When the threshold value used for the foreign object detection processing at the driving of 5 V is set to 35 mA and the threshold value used for the foreign object detection processing at the driving of 19 V is set to 130 mA based on the above described reference of the transmission current, the results of the foreign object detection processing are respectively shown as an example of determination about whether the foreign object can be detected. "O" in the determination about whether the foreign object can be detected indicates that the foreign object can be detected. "x" in the determination about whether the foreign object can be detected indicates that a measured value of the transmission current does not exceed the threshold value and the foreign object cannot be detected.

As shown in the determination about whether the foreign object can be detected, there is a case in which the foreign object cannot be detected because the increase amount in the transmission current is small due to the influence of the foreign object at the driving of 5 V. However, at the driving of 19 V, even when the load circuit 37 is not connected, since the increase amount in the transmission current is large due to the influence of the foreign object, under the condition that the foreign object cannot be detected at the driving of 5 V, it can be confirmed that the foreign object can be detected.

As described above, the non-contact power transmission apparatus 1 includes the non-contact power supply apparatus 2 and the non-contact power reception device 3 for receiving the electric power supplied from the non-contact power supply apparatus 2.

The non-contact power supply device 2 includes the power transmission coil 15 and the power transmission circuit 14 for transmitting the electric power by the power transmission coil 15 by using the electric power of either the first voltage or the second voltage lower than the first voltage.

The non-contact power reception device 3 includes the power reception coil 31 electromagnetically coupled with the power transmission coil 15, and the load circuit 37 to which the electric power received by the power reception coil 31 is supplied.

The non-contact power supply device 2 drives the power transmission circuit 14 at the second voltage to carry out the authentication processing with the non-contact power reception device 3 and the first foreign object detection processing for detecting the presence or absence of the foreign object.

If the authentication processing is successful and the foreign object is not detected by the first foreign object detection processing, the non-contact power supply device 2 drives the power transmission circuit 14 at the first voltage so as to supply the electric power to the non-contact power reception device 3 in a state in which the load circuit 37 is not connected to the power reception coil 31, and carry out the second foreign object detection processing for detecting the presence or absence of the foreign object.

According to such a configuration, in a state in which the load circuit 37 is not connected to the power reception coil 31 in the non-contact power reception device 3, the non-contact power supply device 2 drives the power transmission circuit at the first voltage larger than the second voltage to increase the electric power output from the power transmission coil 15. Further, the non-contact power supply device 2 carries out the second foreign object detection processing after increasing the electric power from the power transmission coil 15. The non-contact power supply device 2 can carry out the second foreign object detection processing in a state in which the electric power output from the power transmission coil 15 is greater than that at the time of executing the first foreign object detection processing. As a result, the non-contact power supply device 2 can execute the second foreign object detection processing which detects the foreign object with higher accuracy than the first foreign object detection processing.

If the load circuit 37 is connected to the power reception coil 31 in the non-contact power reception device 3, since the load electromagnetically coupled with the power transmission coil 15 is increased, the electric power output from the power transmission coil 15 further increases. Therefore, if there is the foreign object, there is a possibility that the foreign object generates heat due to the electric power output from the power transmission coil 15. However, the non-contact power supply device 2 carries out the foreign object detection processing by driving the power transmission circuit 14 at the first voltage higher than the second voltage corresponding to the standby state before the load circuit 37 is connected to the power reception coil 31 in the non-contact power reception device 3, thereby suppressing the heat generation by the foreign object and detecting the foreign object with high accuracy. As a result, it is possible to provide the non-contact power transmission apparatus and the non-contact power supply device capable of detecting the foreign object with high safety and high accuracy.

In the above embodiment, in the non-contact power reception device 3, the second control circuit 39 controls the second switching circuit 36 so as to switch between the state in which the load circuit 37 is connected to the third voltage conversion circuit 34 and the state in which the load circuit 37 is not connected to the third voltage conversion circuit 34; however, the present invention is not limited to this configuration. In the non-contact power reception device 3, the second switching circuit 36 may be omitted as shown in FIG. 7 as long as the third voltage conversion circuit 34 can perform output or stop output according to the control of the second control circuit 39.

Figure 7:
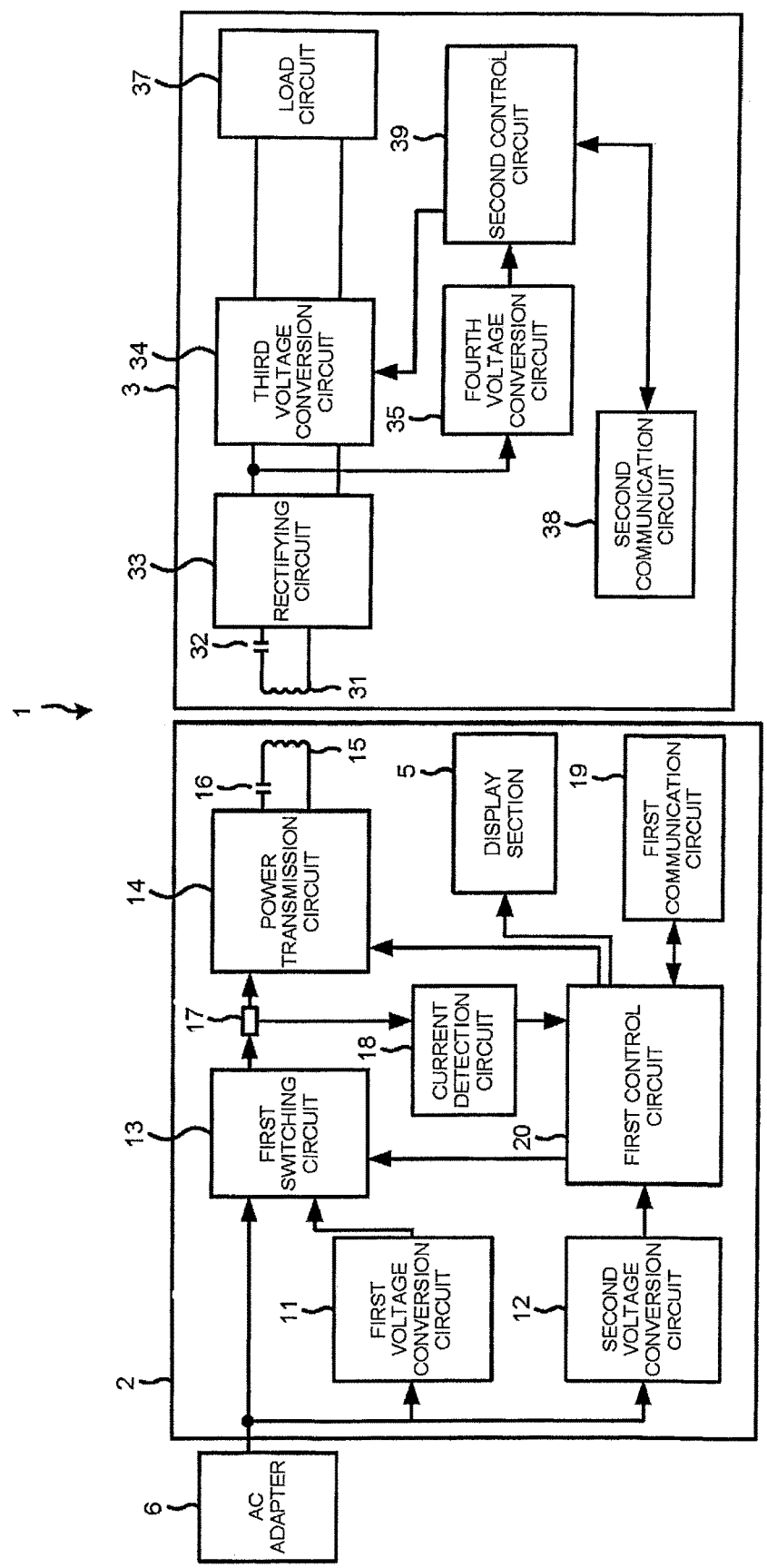
FIG. 7 is a diagram illustrating another configuration example of the non-contact power supply device and the non-contact power reception device of the non-contact power transmission apparatus according to some embodiments.

In the non-contact power reception device 3, the second switching circuit 36 may be omitted as shown in FIG. 7 as long as the non-contact power reception device 3 switches between a state in which the charging circuit for charging the rechargeable battery sets the charging current to the rechargeable battery to 0 or a very small value and a state in which the charging circuit sets the charging current to the rechargeable battery to a normal value.

The functions described in the above embodiments can be realized not only by using hardware but also by reading a program recording each function in a computer by using software stored in a memory. Each function may be configured by selecting software or hardware as appropriate.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A non-contact power transmission apparatus, comprising:
   a non-contact power reception device; and
   a non-contact power supply device configured to transmit electric power to the non-contact power reception device, wherein
   the non-contact power supply device comprises:
   a power transmission coil;
   a power transmission circuit configured to transmit electric power by the power transmission coil; and
   a first control circuit configured to drive the power transmission circuit by using electric power of either a first voltage or a second voltage lower than the first voltage, the non-contact power reception device comprises:
   a power reception coil electromagnetically coupled with the power transmission coil; and
   a load circuit to which the electric power received by the power reception coil is supplied when connected to the power reception coil, wherein
   the first control circuit is configured to drive the power transmission circuit by using the electric power of the second voltage, to carry out an authentication processing with the non-contact power reception device, to drive the power transmission circuit by using the electric power of the first voltage when the authentication processing is successful, and to carry out a foreign object detection processing for detecting a foreign object before the load circuit and the power transmission coil are connected in the non-contact power reception device.

2. The non-contact power transmission apparatus according to claim 1, wherein
   when the foreign object is detected in the foreign object detection processing, the first control circuit is configured to lower a voltage for driving the power transmission circuit from the first voltage to the second voltage, or to stop an operation of the power transmission circuit.

3. The non-contact power transmission apparatus according to claim 1, wherein
   the first control circuit is configured to transmit a load connection instruction to the non-contact power reception device when no foreign object is detected in the foreign object detection processing, and
   the non-contact power reception device further comprises a second control circuit configured to connect the load circuit and the power reception coil when the load connection instruction is received from the non-contact power supply device.

4. The non-contact power transmission apparatus according to claim 2, wherein
   the first control circuit is configured to transmit a load connection instruction to the non-contact power reception device when no foreign object is detected in the foreign object detection processing, and
   the non-contact power reception device further comprises a second control circuit configured to connect the load circuit and the power reception coil when the load connection instruction is received from the non-contact power supply device.

5. The non-contact power transmission apparatus according to claim 1, wherein
   the non-contact power reception device further comprises a second control circuit configured to connect the load circuit and the power reception coil when the electric power supplied from the non-contact power supply device is not lowered for a preset predetermined time interval.

6. The non-contact power transmission apparatus according to claim 2, wherein
   the non-contact power reception device further comprises a second control circuit configured to connect the load circuit And the power reception coil when the electric power supplied from the non-contact power supply device is not lowered for a preset predetermined time interval.

7. A non-contact power supply device for supplying electric power to a non-contact power reception device comprising a power reception coil and a load circuit to which the electric power received by the power reception coil is supplied when connected to the power reception coil, the non-contact power supply device comprising:
   a power transmission coil electromagnetically coupled with the power reception coil;
   a power transmission circuit configured to transmit electric power by the power transmission coil; and
   a control circuit configured to drive the power transmission circuit by using electric power of either a first voltage or a second voltage lower than the first voltage, wherein
   the control circuit is configured to drive the power transmission circuit by using the electric power of the second voltage, to carry out an authentication processing with the non-contact power reception device, to drive the power transmission circuit by using the electric power of the first voltage when the authentication processing is successful, and to carry out a foreign object detection processing for detecting a foreign object before the load circuit and the power transmission coil are connected in the non-contact power reception device.

8. The non-contact power supply device according to claim 7, wherein
   when the foreign object is detected in the foreign object detection processing, the first control circuit is configured to lower a voltage for driving the power transmission circuit from the first voltage to the second voltage, or to stop an operation of the power transmission circuit.

9. The non-contact power supply device according to claim 7, wherein
   the first control circuit is configured to transmit a load connection instruction to the non-contact power reception device when no foreign object is detected in the foreign object detection processing.

10. A method of operating a non-contact power transmission apparatus, the non-contact power transmission apparatus comprising a non-contact power reception device and a non-contact power supply device configured to transmit electric power to the non-contact power reception device, the non-contact power reception device comprising a power reception coil electromagnetically coupled with a power transmission coil of the non-contact power supply device, and a load circuit to which the electric power received by the power reception coil is supplied when connected to the power reception coil, the method comprising:

driving a power transmission circuit of the non-contact power supply device to transmit electric power by the power transmission coil by using the electric power of a second voltage, lower than a first voltage;
   carrying out an authentication processing with the non-contact power reception device;
   driving the power transmission circuit by using the electric power of the first voltage when the authentication processing is successful; and
   carrying out a foreign object detection processing for detecting a foreign object before the load circuit and the power transmission coil are connected in the non-contact power reception device.

11. The method according to claim 10, wherein
   when the foreign object is detected in the foreign object detection processing, lowering a voltage for driving the power transmission circuit from the first voltage to the second voltage, or stopping an operation of the power transmission circuit.

12. The method according to claim 10, further comprising:
   transmitting a load connection instruction to the non-contact power reception device when no foreign object is detected in the foreign object detection processing; and
   connecting the load circuit and the power reception coil when the load connection instruction is received from the non-contact power supply device.

13. The method according to claim 10, further comprising:
   connecting the load circuit and the power reception coil when the electric power supplied from the non-contact power supply device is not lowered for a preset predetermined time interval.

* * * * *